United States Patent

[11] 3,618,007

| [72] | Inventor | Victor C. Anderson |
| | | San Diego, Calif. |
| [21] | Appl. No. | 877,715 |
| [22] | Filed | Nov. 18, 1969 |
| [45] | Patented | Nov. 2, 1971 |
| [73] | Assignee | The United States of America as represented by the Secretary of the Navy |

[54] VERTICAL OBSTACLE PROFILING SONAR
10 Claims, 5 Drawing Figs.
[52] U.S. Cl. .................................................. 340/3 R, 340/6 R
[51] Int. Cl. ..................................................... G01s 9/68
[50] Field of Search.......................................... 340/3, 3 R, 6, 16 P

[56] References Cited
UNITED STATES PATENTS
| 3,381,264 | 4/1968 | Lavergne et al. | 340/3 |
| 3,469,230 | 9/1969 | Haney et al. | 340/3 |

*Primary Examiner*—Richard A. Farley
*Attorneys*—R. S. Sciascia and Paul N. Critchlow ABSTRACT: The sonar functions in a pulsed active-mode utilizing a projector to insonify a fan-shaped region of an ocean floor area in front of the submersible. Backscattered signal returns are received by two hydrophones having acoustic centers located in close proximity (about 0.35 inch) one to the other. Range is determined by elapsed time between transmission and reception. Direction in a vertical plane relative to the axis of the submersible is determined by the relative phase between the signal outputs of the vertically spaced hydrophones. The outputs are coupled to a signal processor employing a time-varying gain to compensate for beam-spreading losses and then to separate clipper amplifiers. The positive transition of one clipper output is used to reset a sawtoothed generator and the negative transition of the other clipper triggers a pulse generator. Combining the outputs of the sawtooth and pulse generators provides phase information proportional to the arrival angle of the return signal. When combined with range, the results can be displayed to provide a vertical and horizontal coordinate display for navigation purposes. An envelope detector is connected to one of the signal processor channels to intensity modulate the display for highlighting stronger returns.

VERTICAL OBSTACLE PROFILING SONAR

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

Operators or pilots of deep submersibles operating near the ocean floor obviously must avoid obstacles such as bottom irregularities or possibly sunken vessels which lie directly in their path. Also, the pilots require accurate information regarding the slope angle of the sea floor. Although there are, of course, a wide variety of navigation sonars operating on differing principles, none of these systems, as far as is known, are suitable for the dead-ahead navigation along an ocean floor up to ranges of about 500 yards. Some systems might be capable of detecting relatively large and protruding objects along an intended path of travel, although the accuracy of such systems for short range navigation is questionable. Under other conditions involving primarily slope information their effectiveness is greatly reduced. Further, under a so-called 'worst-case' condition involving a smooth sandy bottom, the present systems provide very little, if any, useful information. One reason for the difficulties resides in the fact that the display information must be obtained from backscattered returns which cannot readily lend themselves to signal processing for vertical slope or irregularity determinations, particularly when the projected beam strikes the bottom at a relatively minor, grazing angle. As will be described, the present invention derives its data by measuring the phase difference between signal outputs of a pair of receiving hydrophones which are spaced one from the other to produce the phase variation. It is known that this principle broadly has been employed in systems known as Bearing Deviation Indicator (BDI) systems which utilized hydrophones spaced side by side to obtain bearing information concerning a particular target or object. Although such systems operate satisfactorily for their designed purposes, they are not suitable for the present purposes which require backscattered returns from sloping sandy bottoms as well as the stronger returns from large objects or targets.

SUMMARY OF THE INVENTION

A narrow band acoustic pulse is transmitted at regular intervals and the vertical arrival direction of backscattering from the sea floor is determined by measurement of the phased differences between the outputs of two receiving transducers one mounted above the other. The vertical center-to-center spacing of the transducers is somewhat critical to the extent that this spacing must be sufficiently small so that the output of the upper receiver leads that of the lower one by a phase angle $\Phi$ which remains within a single cycle ($2\pi$) range for all values of the vertical angle direction of backscattering, this being an angle measured relative to the axis of the transducers. In practice, a spacing of 0.35 inches has been found satisfactory. A two-channel signal processor is used to derive the phase measurements and each of the receiver outputs is coupled to a separate channel of the processor. Preferably, phase differences are determined by an axis-crossing technique. To achieve this end, each channel of the signal processor preferably includes a clipper amplifier to provide positive and negative transitions used to trigger subsequent generators which directly or indirectly drive display circuits. Most suitably, the clipper amplifier of one channel drives a sawtooth generator while the clipper amplifier of the other channel drives a pulse generator. A comparison of the output pulse of these two transducers is translated into phase versus slant range data which, if desired, can be further converted to elevation versus horizontal coordinate data by using a coordinate transformation computer. A particular feature of the present invention lies in the use of a discriminating means capable of highlighting stronger returns at the expense of the weaker returns. In this regard, the system naturally responds best to the stronger returns from the more pronounced irregular features and the discriminating means is employed to intensity modulate the display in response to the stronger signal returns. However, to avoid misconception, it should be again noted that the system also is designed for a worst-case condition of a smooth sandy bottom in which it is capable of discriminating to an extent sufficient to permit navigation along gradual slopes. Other significant features of the invention will be described in greater detail in the description which is to follow.

An object of the present invention is to provide a pulse, active-mode sonar system capable of measuring the relative phase of the outputs of two vertically displaced receivers.

A more specific object is to provide a system in accordance with the foregoing object, the system being capable of determining the arrival angle of backscattering from the ocean bottom so as to provide phase versus slant-range data.

Another important object is to provide a system with a means for discriminating the more pronounced irregular features of the ocean bottom to the extent that these features are selectively displayed.

Still another object is to provide a system capable of converting the derived phase versus slant-range data to elevation versus horizontal range date.

Another general object is to provide accurate short range navigational data for submersibles operating on or near the ocean floor, the data being accurate under all conditions including the so-called 'worst-case' condition involving a smooth sandy bottom.

Other objects and their attendant advantages will become more apparent in the subsequent description.

BRIEF DESCRIPTION OF THE DRAWINGS

The invention is illustrated in the accompanying drawings of which.

DETAILED DESCRIPTION OF THE PRESENT INVENTION

Figure 1:
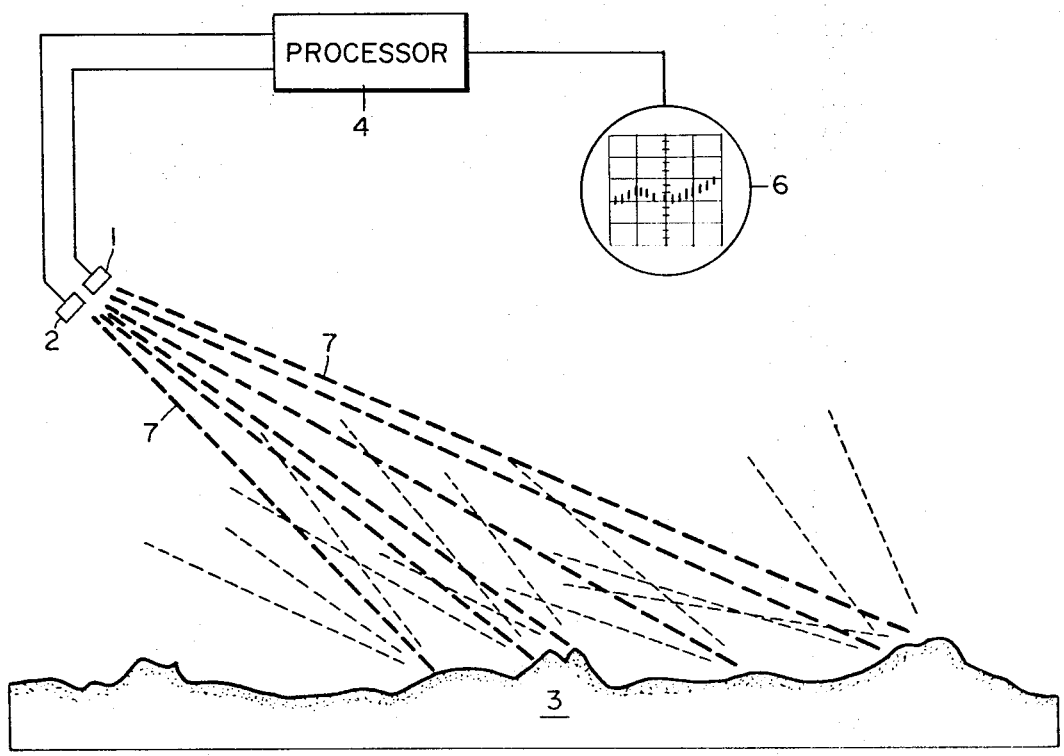
FIG. 1 is a pictorial illustration of the present system illustrating backscattering from an ocean floor and also generally showing one type of display which the present system may employ.

Referring to the drawings, the system pictorially illustrated in FIG. 1 shows a pair of transducers 1 and 2 operating in a receiving mode in which backscattered reflections from an ocean floor 3 are returning to the receivers for processing in a signal processor 4 and ultimate display in an oscilloscope 6. The backscattering beams are shown in dotted lines, the heavier dotted lines 7 representing the main lobes of the returning beam patterns. In the embodiment of FIG. 1, it can be assumed that one of the transducers, such as transducer 1, operates also as a beam projector which can be shifted from a driven to a receiving mode by a conventional T/R switch. Certain features of the projecting and receiving transducers are rather critical to proper operation of the present system and will be described in some detail. For present purposes, it can be noted that they are mounted one above the other in an arrangement which can be defined as a vertical spacing. Thus, if the receiving transducers were rotated from a FIG. 1 position so as to face horizontally, the centers of the two transducers would be vertically spaced.

The vertical spacing of the receiving transducers is important since it permits the angle of arrival of the echo signal to be accurately determined by measuring the relative phase difference between the signal outputs of the transducers. As previously indicated, split transducers have been used for echo ranging sonar known as the Bearing Deviation Indicator System. However, the technique has not been applied to the problem of measuring the arrival angle of bottom reverberations and, without certain features employed in the present system, the prior echo arranging sonars are not suitable for the accurate analysis of backscatter.

Figure 2:
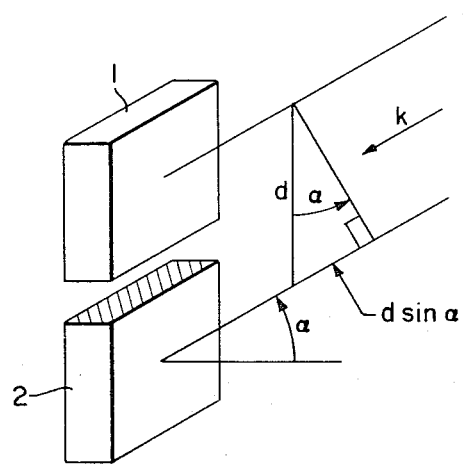
FIG. 2 is a schematic illustration of a pair of receiver transducers showing the geometry applicable to signals arriving at a vertical angle.

Functionally considered the present system employs a narrow-band acoustic pulse transmitted at regular intervals, the vertical arrival direction of backscattering being determined by measuring the axis-crossing phase difference between the outputs of receivers 1 and 2. A closer view of the transducer geometry is shown in FIG. 2. Thus, for a signal arriving at a vertical angle $\alpha$ relative to the axis of the transducers, the output of receiver 2 leads that of receiver 1 by a phase angle $\Phi = kd \sin \beta$, where $k$ is the wave number of the signal and $d$ is the center-to-center spacing of the transducers. The wave number of the signal refers to the $2\pi/\lambda$ relationship in which $\lambda$ represents wavelength. The center-to-center spacing refers to the spacing of the acoustic centers of the transducers which, in the drawing, is designated distance $d$. This spacing $d$ is, as has been indicated, an important consideration to the extent that, if the spacing exceeds a certain amount, the results obtained from the system will become ambiguous and, consequently, not reliable for real time displays although the ambiguities can be resolved by using fathometer charts. For example, an experimental system designed to accomplish the purposes of the present invention utilized a transducer spacing of 2.5 inches and a frequency of 60 kHz. Employing the $\Phi$ relationship stated above, $kd$ approximates $5\pi$ so that, as the elevation varies from $-\pi/2$ to $\pi/2$, the phase varies from $-5\pi$ to $+5\pi$. Since the measured phase can be only in the range of $-\pi$ to $+\pi$, the result obviously is ambiguous. To resolve the ambiguity, it is most desirable that the vertical spacing of the acoustic centers of the transducers be limited to such an extent that, again employing the $\Phi$ relationship stated above, the spacing $d$ is sufficiently close to permit $\Phi$ to remain within a single cycle ($2\pi$) range for all values of $\beta$. If this limitation is observed, ambiguities will not arise. In actual practice, a vertical spacing of 0.35 inches plus or minus 0.5 inches has been successfully used.

Figure 3:
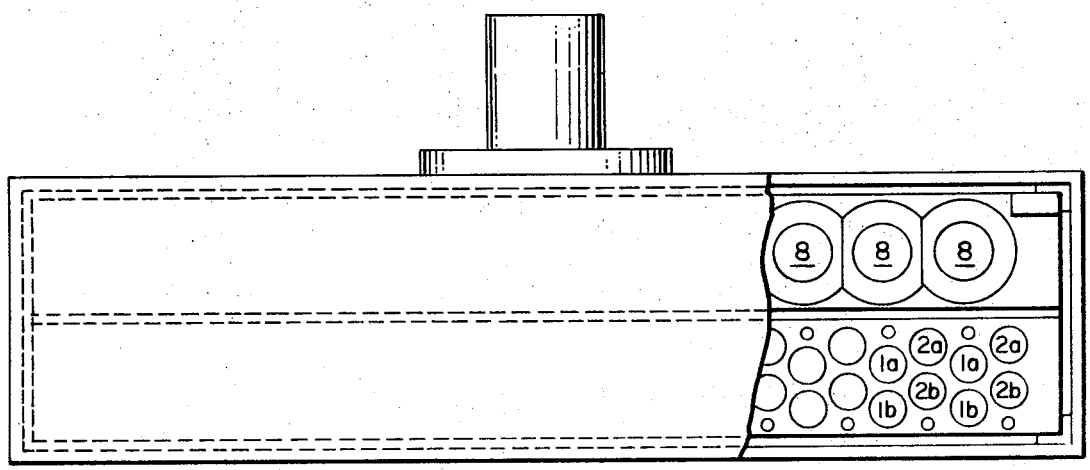
FIG. 3 is a face view of a particular interleaved transducer suitable for the present purposes.

Because of the requirements imposed by the vertical spacing, it is most desirable to use a particular transducer arrangement such as that illustrated in FIG. 3. However, with certain exceptions to be noted, the transducers can be conventional ceramic or other types used for many sonar applications. The arrangement of FIG. 3 primarily is intended to show the desirability of using a so-called interleaved array formed of pairs of vertically spaced transducers 1a–1b and 2a–2b. The need for such an interleaved array can be better appreciated when it is recalled that the vertical spacing should be in the neighborhood of 0.35 inches. Since the transducers employed in the system are approximately 2 inches in height, interleaving is needed. Thus, if such transducers were disposed in a flush vertical arrangement, the center spacing would exceed 0.35 inches.

Another factor to be noted in FIG. 3 is that the transducer assembly may and preferably does include separate transducer projectors 8. This arrangement is in lieu of the arrangement illustrated in FIG. 1 in which one of the transducers is designed to be operated either in the transmit or receive mode. In a preferred operative embodiment, projector transducer 8 is designed to have a beam width of about 5° in the horizontal plane and 60° in the vertical plane. Most suitably, maximum sidelobe levels are about −20 db in the horizontal plane and −10 db in the vertical plane. An appropriate transmission pattern is one of a 2-millisecond duration at a rate of 1 pulse per second at a frequency of 60 kHz. The projector beam pattern axis should be angularly aligned with that of receiver transducers 1 and 2 within plus or minus 1/2° of both the horizontal and vertical directions. Receiver transducers 1 and 2 have an operating frequency of 60 kHz. and beam widths the same as the projector transducer. Further, the sidelobe levels are the same as projector transducer so that, in effect, the receiver beam patterns and orientations are substantially the same as those of the projector.

Figure 4:
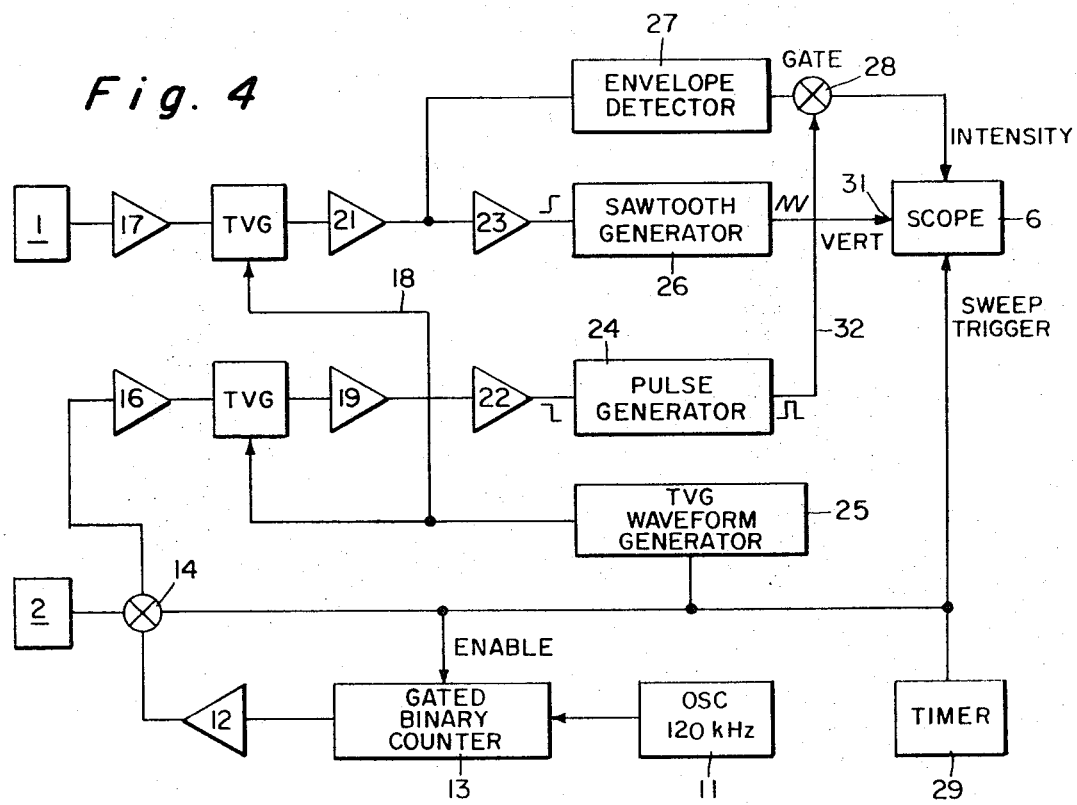
FIG. 4 is a block diagram showing a particular system embodiment in which the derived phase and range data are applied directly to an oscilloscope display.
Figure 5:
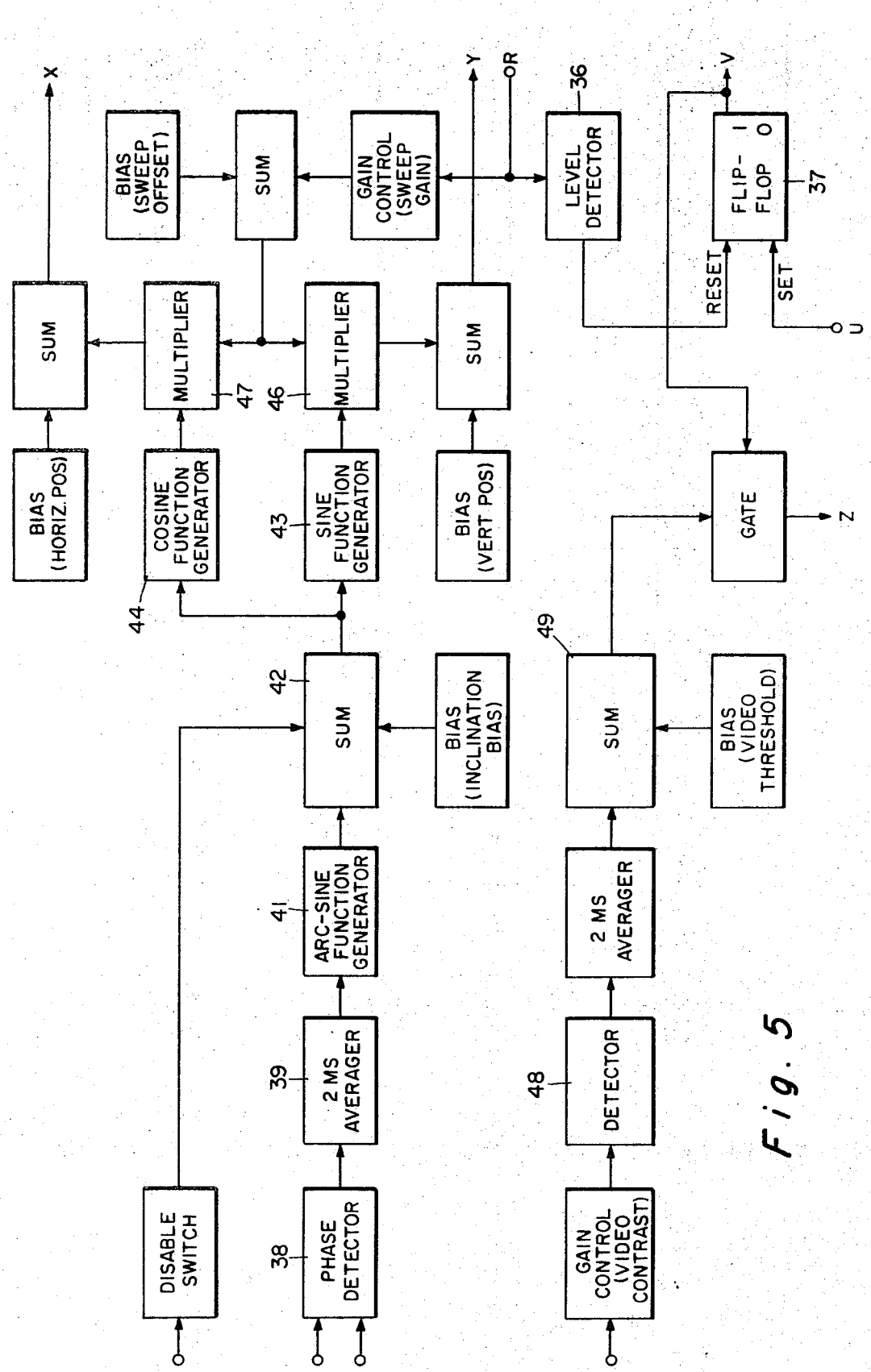
FIG. 5 is another block diagram of a modified system utilizing an analog coordinate transformation computer to derive elevation versus horizontal data for the display.

The signal outputs of transducers 1 and 2 are, as previously stated, applied to a processor 4 (FIG. 1) to measure the phase differences and the information thus obtained displayed on oscilloscope 6. The processing and display can be accomplished in different manners illustrated by the block diagram of FIGS. 4 and 5, although it will be recognized that certain phases of the processing and display can be varied substantially using state of the art techniques. The principal difference between the block diagrams of FIG. 4 and 5 is that FIG. 4 applies the output of the signal processing directly to oscilloscope 6 while FIG. 5 employs a computer to convert the slant-range data produced by the processor 4 to elevational and horizontal range coordinates. This difference will become more apparent in the ensuing detailed description.

Referring to FIG. 4, the system includes an oscillator 11 which runs continuously at twice the signal frequency or, as shown in the drawing, at 120 kHz. A transmitter gate pulse connects one of the transducers, such as transducer 2, to an output driver circuit having a power amplifier 12. The gate pulse further enables a binary frequency divider 13 that produces the input to the driver circuit. Signal frequency is not present in the transmitter circuit except during transmission so that the problem of feedthrough to the receivers is eliminated. The 60 kHz. operating frequency for the system is useful primarily because of the ready availability of transducer elements for that frequency. It further will be recognized that transducer 2, when in the transmit mode, is comparable to projector 8 previously identified with reference to FIG. 3, while transducers 1 and 2 in the receiving mode may be the interleaved transducers.

The receiving mode of the transducers is enabled by a transmit/receive (T/R) switch 14 and the receiving mode transducers 1 and 2 are coupled to twin channels including tuned amplifiers 16 and 17, a time-varying gain circuit 18, second tuned amplifiers 19 and 21 and clipper amplifiers 22 and 23. The tuned amplifiers are filters. Clippers 22 and 23 are employed to generate squarewave patterns having the positive and negative transitions illustrated by the waveforms shown in the drawing. The TVG circuit may be of any conventional type employed in many sonars and other similar equipment to compensate for spreading losses of the beamed signals. As shown, it includes a TVG waveform generator 25 having a gain preferably proportional to $r^3$, where $r$ is the slant range of the object reflecting the signal being processed. The $r^3$ characteristic of the circuit compensates for a two-way spreading loss proportional to $r^{14}$, the loss being $r^{12}$ power for each direction. The $r^3$ is derived by offsetting $r^{14}$ by an increase in the insonified bottom area which is linear with $r$. As noted, TVG waveform generator 25 is started by the same gate pulse that is applied to binary counter 13.

Before continuing with the description the meaning of certain terms perhaps should be clarified. First, so-called processor 4 identified in FIG. 1, is intended to include all of the circuitry shown in FIG. 4 between transducers 1 and 2 and scope 6. However, this processor can be broken down into two sections, the first being a receiver section which includes primarily the tuned amplifiers 16–21 and TVG circuit 18. The section commencing with the clippers 22 and 23 can be defined as a phase detector section which, in addition to the clippers, includes a pulse generator 24 and a sawtooth generator 26. A third section, known as an envelope detector section 27 is coupled to the output of the receiver section at a point in advance of clipper 23 and has an input directly into scope 6 through a gate 28.

Scope 6 is entirely conventional and can be provided by a number of commercially available oscilloscopes of the familiar type having a horizontal sweep generator which, in the present instance, is triggered by the transmitter gate pulse also used to enable counter 13 and waveform generator 25. A timer 29 is employed to control the sweep generator and, of course, the horizontal sweep represents a time interval between the transmitted and received signal, this interval, in the present system, indicating slant range of the object that produces the backscattered beam. This scope further has a vertical control applied at point 31 and, as may be noted, the vertical input for the scope is derived from sawtooth generator 26 so that the display will appear somewhat as shown on scope 6 of FIG. 1.

The principle of operation of the present system is based primarily upon producing a display which shows the time difference between the axis-crossings of the two transducer outputs for each cycle of the return signal, the time difference between these axis-crossings being a function of the phase difference of the transducer outputs and, as previously noted, the phase difference also being proportional to the vertical arrival angle of $\beta$ ($\Phi=kd \sin \beta$). Thus, the information made available on scope 6 includes the slant range data and also phase data providing the angle of the slant or, in other words, the arrival angle of the return signal. The pulse generated by pulse generator 24 simply is an intensifying pulse used in a conventional manner to produce a scope pattern. In particular, it is applied by a circuit 32 to the sawtooth input to intensify the display at a point which represents both phase and slant range. In the present system, this intensification is accomplished by utilizing the positive transition of clipper 23 to reset sawtooth generator 26 which, as stated, drives the vertical input of the scope. The negative transition of clipper 22, in turn, triggers pulse generator 24 and, since the positive and negative transitions of these clippers vary in phase, the intensification represents the phase difference. When the two signals are in phase, the intensifying pulse occurs midway through the sawtooth to produce a spot halfway up the face of the scope. As the relative phase of the two signals changes, the spot moves up or down proportionally.

Envelope detector 27 is employed to intensity modulate the display to highlight the stronger returns. As stated, this particular function is important in the effective operation of the system since, without it, the system, which operates on a cycle-to-cycle basis, would provide a rather confusing picture particularly since the information that is displayed is derived from backscattered signals reflected from an ocean floor. Even under favorable conditions, the processing of backscattering presents difficulties. Under unfavorable conditions, such as when area being viewed varies only by having a gradual slope rather than sharp irregularities or obstacles, the beam producing the backscattering strikes the slope at a rather low grazing angle and the difficulties are significantly increased. To provide accurate information even under a worst-case condition the present system discriminatively highlights stronger returns at the expense of the weaker ones, the stronger returns being obtained from the more irregular features which are the features presenting navigational problems.

Envelope detector 27 simply is a means for intensity modulating scope 6 and such a means is a standard input to most if not all commercial oscilloscopes. However, although the standard inputs may be operator controlled, the present detector is responsive to the strength of the signal in one of the channels of the receiver section, this channel being, as shown, the one having the output from tuned amplifier 21. Such a control may be viewed simply as a contrast control permitting a display of the more irregular bottom features. As another feature, a second scope, not shown in FIG. 4, may be used with a 35 mm. continuous motion camera for data recording. In such an event, it is connected in parallel with the display scope except that no horizontal sweep is used since the time axis is provided by the filmed motion.

The system illustrated in FIG. 5 is somewhat similar to that illustrated in FIG. 4, the difference being that the display of the FIG. 5 system shows the horizontal and vertical coordinates of the reflecting object rather than phase and slant range data. Thus, the system of FIG. 5 is similar to the extent that it functions in a pulsed mode to insonify a fan-shape region in front of the submersible. Reflections from the objects in the fan volume are received by two hydrophones, such as receivers 1 and 2, and these hydrophones have their acoustic centers located in close proximity in the manner and for the purpose already described. The range of the object is determined by elapsed time between transmission and reception while the direction of the object is determined by the relative phase between the signals received by the two hydrophones.

Other features not previously described but useful in most systems of this type include the use of an inclinometer to furnish a signal indicating inclination of the sonar beam axis of symmetry with respect to the horizon. This signal is employed together with the range and phase information, to generate a pair of quadrature deflection signals for a CRT or scope display which is stabilized with respect to the local horizon line. The inclino-meter, which is not shown in the drawings, may be a damped pendulous potentiometer of a type commonly used for ship-borne systems. Also not shown, the transducer assembly may be rotatable about the vertical axis of the vehicle by means of a suitable training mechanism.

Referring to FIG. 5, it first should be noted that the drawing includes several previously-unidentified signals such as signals Z, U, V, R, Y and X. Signals X, Y and Z are outputs to an oscilloscope such as scope 6, signals X and Y being derived from the signal processor while signal Z is comparable to the output of envelope detector 27 considered with reference to FIG. 4. Signal U represents a trigger pulse derived from the projector or transmitter in a manner similar to that described with reference to FIG. 4, while signal R is a range signal generated in a known manner in the form of a ramp. In a manner to be described, signal R is applied to a computer section of the signal processor to provide range data that can be summed with the phase measurement to produce horizontal or vertical coordinate displays.

Signal R also is applied to level detector 36 the output of which resets a flip flop 37 to generate signal V. In effect, signal V is a blanking signal generated as a variable-duration pulse by the flip flop and the arrangement is one in which the trigger pulse (signal U) sets the flip flop to the ONE State and initiates generation of the ramp waveform of signal R. When the ramp amplitude corresponds to full-scale range, this condition is sensed by level detector 36 which, as shown, has an output which resets the flip-flop output to the ZERO State. Thus, the ONE State of signal V corresponds to the time interval between transmission of an acoustic pulse and reception of reflections of objects within full-scale range of the sonar. The ZERO State corresponds to the dwell interval between the end of the time interval corresponding to maximum range and the occurrence of the next interrogation. All of these components obviously are well known in the art and should be easily implemented without further description.

As stated, signals X, Y and Z are obtained from the signal processor and the envelope detector. In this regard, this system includes a phase detector 38 which, referring to FIG. 4, receives the output of tuned amplifiers 19 and 21. The phase detector is employed to generate a voltage proportional to the instantaneous phase angle of the outputs of the vertically spaced transducers. Preferably, it includes a sawtooth generator, such as generator 26 (FIG. 4), and a pulse generator similar to generator 24. The output of phase detector 38 is applied to a 2 millisecond averager 39 which then is converted to a voltage proportional to the average phase angle between the signals of the transducers 1 and 2 by an arc-sine function generator 41.

As to phase detector 38, its proportional voltage is obtained by applying the output pulse of generator 24 to the sawtooth pattern to hold the voltage of the sawtooth at the level it has obtained at the moment the pulse is applied to it. This level then is held until the application of the next pulse and, as will be appreciated, the phase difference in the clipper outputs which trigger the two generators will produce an incremental change in the cycle-to-cycle voltage of the sawtooth. Averager 39 averages the increments over a period of 2 milliseconds (120 cycles) prior to application to arc-sine function generator 41. The output of generator 41 is summed with the inclinometer signal and with an adjustable bias to generate a voltage proportional to acoustic source inclination angle with respect to an arbitrary reference line stabilized with regard to the horizon.

Voltages proportional to the sine and cosine then are generated by means of sine and cosine function generators 43 and 44 and these generated voltages multiplied in multipliers 46 and 47 by ramp signal R which is proportional to range. A gain and bias control may be applied to signal R to manipulate the display and biases are furnished to manipulate the origin of the coordinate system. The outputs of the multipliers are the oscilloscope deflection signals which, in turn, are proportional to the vertical plane cartesian coordinates of the acoustic reflector. The ZERO State of the display gate (signal V) blanks the video signal during its retrace interval and, in addition, signal V is furnished to the display scope.

An envelope detector similar in function to detector 27 also is used in the FIG. 5 system and, as already stated, it is applied to the scope as signal Z. Signal Z thus is an intensity modulation signal obtained by detecting and averaging one of the sonar return signals, this signal, as shown in FIG. 4, being the signal output of transducer 1. It also is to be noted that this signal is derived directly from the output of a tuned amplifier such as amplifier 21 of the receiver section and that it constitutes a separate input into the scope. More specifically, signal Z is derived from an envelope detector 48 similar in function to envelope detector 27 of FIG. 4 to the extent that it can be provided in a manner comparable to the intensity modulators of commercial oscilloscopes. The arrangement includes a gain control for video contrasts and the output of the detector is averaged over an interval equal to the transmitted pulse width. A summer 49 includes a bias control similar to the gain control employed to properly interface the output signal to the display scope.

In effect, it will be seen that the system of FIG. 5 is one in which the output of the phase detector of the signal processor is applied as a voltage to a computer which is an analog coordinate transformation computer capable of deriving sine and cosine functions dependent in value upon the phase difference in the receiver signal outputs. The functions are multiplied in the computer by range values and applied to the scope as X and Y coordinates to facilitate the reading of the scope and render its information more intelligible and usable. Other computers can, of course, be substituted.

It is believed that the operation of the present sonar system is readily understandable from the foregoing description in which its operative modes have been considered in some detail. Although the system utilized the familiar principle of the bearing deviation indicator, it is capable of applying this principle to ocean floor navigation utilizing backscatter from a projected beam and it further is capable of achieving satisfactory accuracy even under unfavorable ocean floor conditions such as exist in relatively smooth, sandy bottom surfaces. Functionally, the information provided by the system permits navigation along gentle ocean floor slopes as well as navigation to or around obstacles in the path of the submersible in which it is mounted. The preferred range is from 10 to 500 yards, although this, of course, could be varied in accordance with the nature of the projected beam and the power employed. As to accuracy, the system is capable of detecting depression angles to within plus or minus 1° and the target range within plus and minus 10 feet. Some of the features which provide the advantages achieved by the system include the spacing of the transducers, the ability of the system to compensate for beam spreading losses by the use of a time-varying gain circuit, the ability of the system to highlight irregularities on the ocean floor, and the simple and effective manner of utilizing the sawtooth generator and the pulse generator to provide the axis-crossing phase differences needed for the display.

Obviously many modifications and variations of the present invention are possible in the light of the above teachings. It is therefore to be understood that within the scope of the appended claims the invention may be practiced otherwise than as specifically described.

I claim:

1. Pulsed active-mode apparatus for discriminatively detecting ocean bottom irregularities comprising:
   a transducer assembly including:
      an acoustic signal beam projector,
      pulse gating means for driving said projector, and
      a pair of signal receivers having acoustic centers spaced vertically one from the other for producing a phase difference $\Phi$ in their signal outputs equal to $kd \sin \beta$ wherein $k$ is the wave number of the signal, $d$ is the center spacing and $\beta$ is the vertical arrival angle of the received signal, said spacing $d$ being sufficiently small to permit $\Phi$ to remain within a single cycle ($2\pi$) range for all values of $\beta$,
   signal processing means or measuring the phase difference of said receiver outputs, said means formed of a pair of signal processing channels each having an input coupled to a separate receiver output,
   means responsively coupled to said processing means for displaying said phase difference measurements, and
   a signal-discriminating circuit means coupling one of said channels to said display, said circuit means including means for intensity modulating the display in accordance with the strength of the signal in said channel whereby relatively strong signal returns produced by relatively pronounced bottom irregularities can be discriminatively displayed.

2. The apparatus of claim 1 wherein said signal receivers have essentially the same beam patterns and orientations as the projector.

3. The apparatus of claim 1 wherein said signal processing means includes circuit elements permitting measurement of the axis-crossing phase difference between the signal outputs of the receivers.

4. The apparatus of claim 3 wherein said display means is an oscilloscope, the apparatus further including circuit means coupling said projector pulse gating means with said oscilloscope for triggering a horizontal sweep providing a time axis for said display.

5. The apparatus of claim 4 wherein one of said signal processing channels includes a phase-responsive sawtooth generator having an output coupled to said oscilloscope for driving its vertical input,
   the other of said channels including a phase-responsive pulse generator and means for gating the generated pulse into said oscilloscope,
   said gated pulse being applied to said sawtooth vertical input for intensifying its sawtooth pattern at a particular location,
   said location thus being representative of the phase difference between said sawtooth generator and pulse generator.

6. The apparatus of claim 5 wherein said intensity controlling discrimination means is coupled to said oscilloscope through said generated pulse gating means.

7. The apparatus of claim 1 further including an analogue coordinate transformation computer coupled between the output of the said signal processing means and the display for connecting phase difference measurements into horizontal and vertical range coordinates,
   said computer having an input coupled to said pulsed projector driving means for supplying range data to the computer.

8. The apparatus of claim 7 wherein one of said signal processing channels includes a phase-responsive sawtooth generator and the other channel includes a phase-responsive pulse generator,
   said signal processing means further including means for gating said channel generated pulse to said sawtooth generator output for holding the voltage of said sawtooth at constant level pending generation of a succeeding pulse, the voltage increments on the sawtooth produced by succeeding pulses being a measure of the phase differences and said increments providing inputs for said computer representative of said arrival angle $\beta$, said computer connecting said angle and range inputs into said coordinates.

9. The apparatus of claim 1 wherein said pair of receivers are interleaved.

10. The apparatus of claim 1 wherein said signal processing means includes a time-varying gain circuit adapted to compensate for spreading losses in said projected and returned beam signals.

* * * * *